United States Patent
Bekiares et al.

(10) Patent No.: US 8,649,339 B2
(45) Date of Patent: Feb. 11, 2014

(54) METHOD AND APPARATUS FOR DISTRIBUTING VIDEO PACKETS OVER MULTIPLE BEARERS FOR PROVIDING UNEQUAL PACKET LOSS PROTECTION

(75) Inventors: Tyrone D. Bekiares, Chicago, IL (US);
Anatoly Agulnik, Deerfield, IL (US);
Trent J. Miller, West Chicago, IL (US);
James M. Nowakowski, Buffalo Grove, IL (US); Steven D. Tine, Buffalo Grove, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 311 days.

(21) Appl. No.: 12/910,742

(22) Filed: Oct. 22, 2010

(65) Prior Publication Data
US 2012/0099564 A1    Apr. 26, 2012

(51) Int. Cl.
H04W 4/00    (2009.01)
H04W 72/08    (2009.01)
H04L 12/26    (2006.01)

(52) U.S. Cl.
USPC ............................ 370/329; 370/336; 370/341

(58) Field of Classification Search
None
See application file for complete search history.

(56) References Cited

U.S. PATENT DOCUMENTS

| | | | |
|---|---|---|---|
| 2002/0116715 A1 | 8/2002 | Apostolopoulos | |
| 2002/0157058 A1* | 10/2002 | Ariel et al. | 714/774 |
| 2004/0105589 A1* | 6/2004 | Kawaharada et al. | 382/236 |
| 2006/0018379 A1 | 1/2006 | Cooper | |
| 2008/0069242 A1* | 3/2008 | Xu et al. | 375/240.24 |
| 2008/0123660 A1 | 5/2008 | Sammour et al. | |
| 2009/0077254 A1* | 3/2009 | Darcie et al. | 709/231 |
| 2010/0322069 A1* | 12/2010 | Song et al. | 370/229 |
| 2012/0099416 A1 | 4/2012 | Bekiares et al. | |

FOREIGN PATENT DOCUMENTS

| | | |
|---|---|---|
| EP | 2234342 A1 | 9/2010 |
| WO | 2008021182 A2 | 2/2008 |
| WO | 2010068600 A2 | 6/2010 |

OTHER PUBLICATIONS

Ali Yaver, et al. "Utilization of Multi-Radio Access Networks for Video Streaming Services", Wireless Communications and Networking Conference, 2009, WCHC 2009, IEEE, Piscataway, NJ; Apr. 5, 2009, p. 1-6; XP031454512; ISBN:978-1-4244-2947-9, Sections 1, 11 and 111.
PCT International Search Report PCT/US2011/054204 Dated Feb. 7, 2012 for Counterpart Application.

(Continued)

*Primary Examiner* — Chi Pham
*Assistant Examiner* — Soon-Dong D Hyun
(74) *Attorney, Agent, or Firm* — Valerie M. Davis; Kenneth A. Haas

(57) ABSTRACT

A method and apparatus distributes video packets over multiple bearers for providing unequal packet loss protection. The method includes a packet processing function receiving a plurality of packets collectively comprising a flow of sequential data included in a sequence of media frames. For each packet, the packet processing function: applies a bearer selection process to select one of a plurality of bearers for transporting the packet over an access network, wherein each bearer has a different quality of service level which influences the probability of the transported packets being intentionally discarded by the access network, wherein the bearer selection process causes distribution of the plurality of packets across the plurality of bearers such that each bearer carries non-consecutive packets both within any given media frame and across sequential media frames and provides unequal packet loss protection for the packets in the plurality; and provides an indication of the selected bearer.

16 Claims, 4 Drawing Sheets

(56) References Cited

OTHER PUBLICATIONS

Lu Jianhua, et al. "Robust Video Transmission Over Correlated Mobile Fading Channels", IEEE Transactions on Circuits and Systems for Video Technology, IEEE Service Center, Piscataway, NJ, vol. 9, No. 5, Aug. 1, 1999; XP011014594; ISSN:1051-8215.
PCT International Search Report PCT/US2011/054209 Dated Feb. 7, 2012 for Related U.S. Appl. No. 12/910,137.
"Optimization of Video Streaming Over 3G Networks"; Dissertation, Mar. 25, 2010; Section 5.2.2, p. 89-90.
Bergeron, et al., "Modelling H.264/AVC Sensitivity for Error Protection in Wireless Transmissions"; 0-7803-9752; May 2006, IEEE; 4 Pages.
Postel, J., "Darpa Internet Program Protocol Specification," RFC 791, Sep. 1981, 49 pages.
Deering, S., et al., "Internet Protocol, Version 6 (IPv6) Specification," Network Working Group, RFC 2460, Dec. 1998, 40 pages.
Postel, J., "User Datagram Protocol," RFC 768, Aug. 28, 1980, 4 pages.
Schulzrinne, H., "RTP: A Transport Protocol for Real-Time Applications," Network Working Group, RFC 3550, Jul. 2003, 89 pages.
Non Final Office Action mailed Aug. 28, 2012 in related U.S. Appl. No. 12/910,137, Tyrone D Bekiars, filed Oct. 22, 2010.
Notice of Allowance dated Oct. 24, 2012 in related U.S. Appl. No. 12/910,137, Tyrone D Bekiars, filed Oct. 22, 2010.

* cited by examiner

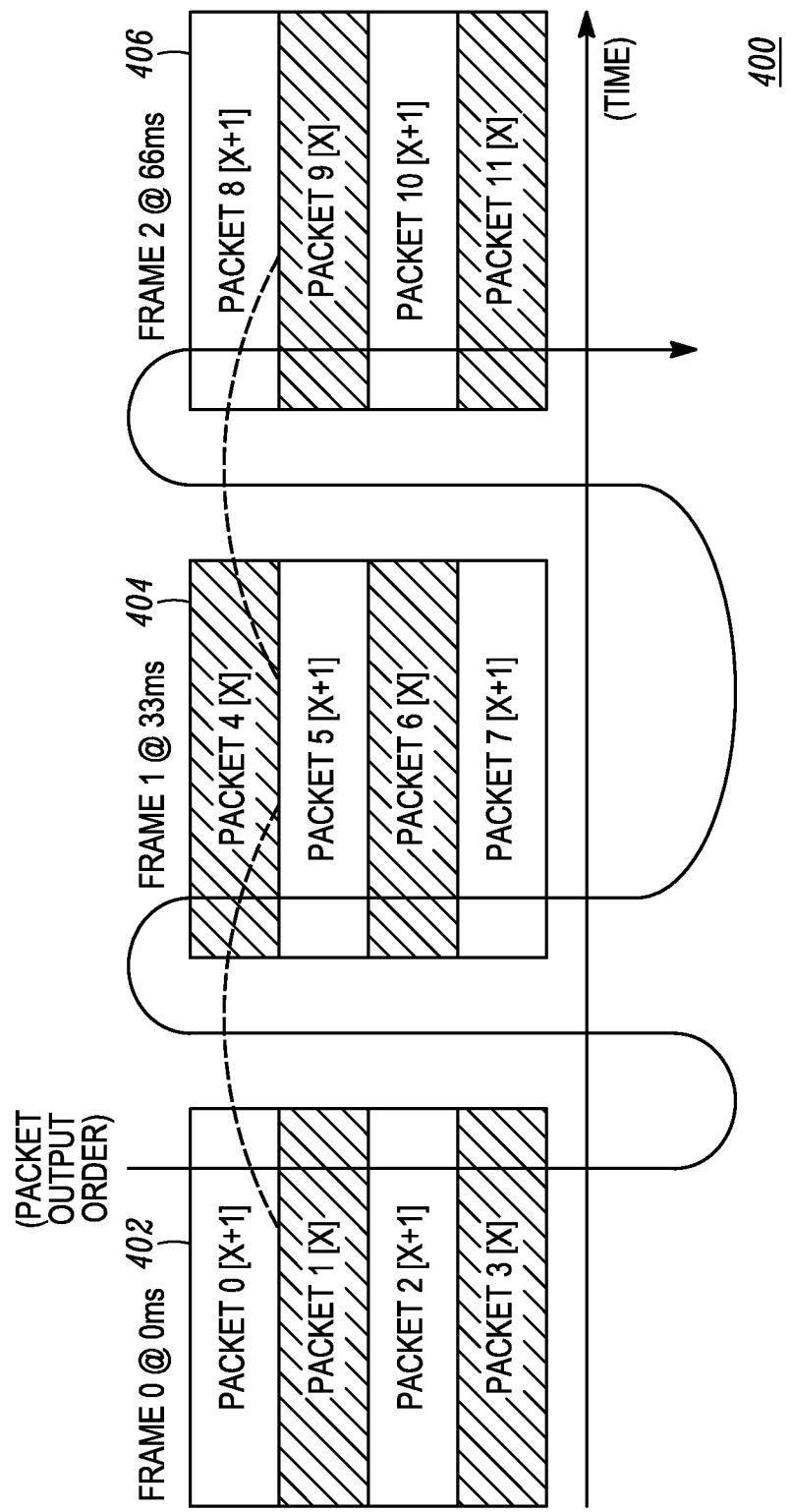

METHOD AND APPARATUS FOR DISTRIBUTING VIDEO PACKETS OVER MULTIPLE BEARERS FOR PROVIDING UNEQUAL PACKET LOSS PROTECTION

REFERENCE TO RELATED APPLICATIONS

The present application is related to the following U.S. applications commonly owned together with this application by Motorola, Inc.: Ser. No. 12/910137, filed Oct. 22, 2010, titled "Method and Apparatus for Distributing Video Packets over Multiple Bears for Providing Unequal Packet Loss Protection" by Bekiares, et al.

TECHNICAL FIELD

The technical field relates generally to transmission of video media over wireless networks and more particularly to the distribution of video packets over multiple bearers to provide unequal packet loss protection for these packets while being transported over a wireless network.

BACKGROUND

Use of streaming media technology (e.g. video over Internet Protocol (IP) and voice over IP) is growing across all market segments, inclusive of consumer, enterprise, and public safety. Today, such media is commonly transported over wired or fixed wireless networks. However, advances in wireless broadband technology are enabling such media to also be streamed over next generation wireless broadband networks.

Wireless networks are generally bandwidth limited with respect to the demand for use of these networks. Contention for wireless resources, coupled with the physics of mobile wireless (e.g. signal strength, fading) typically cause great fluctuations in available bandwidth between any two devices communicating over the network. When bandwidth demands of an application within a source device exceed instantaneous bandwidth available on the network, packet loss occurs.

This is an important consideration, as the packet loss pattern inflicted on streaming media, such as audio and video, has ramifications on the quality of the media when it is reproduced at a destination device. Notably, some amount of random-like packet loss within a media stream is anticipated, and can be effectively concealed by an error resilient decoder. Overloaded best effort transmission queues, however, typically do not inflict random-like packet loss upon a media stream, but rather indiscriminately drop or delay long chains of consecutive packets. Consecutive packet loss, as opposed to random-like packet loss, will cause significantly degrading artifacts in the decoded media quality.

As noted above, some amount of packet loss is unavoidable due to the constrained nature of wireless networks. Furthermore, uncontrolled packet loss can lead to significantly degraded media quality.

Thus, there exists a need for a mechanism to control which video packets are discarded by a wireless network, thereby, providing unequal packet loss protection in such a way as to optimize decoded media quality.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

FIG. 4 illustrates the bearer selection method of FIG. 3, as applied to video frames.

Figure 1:
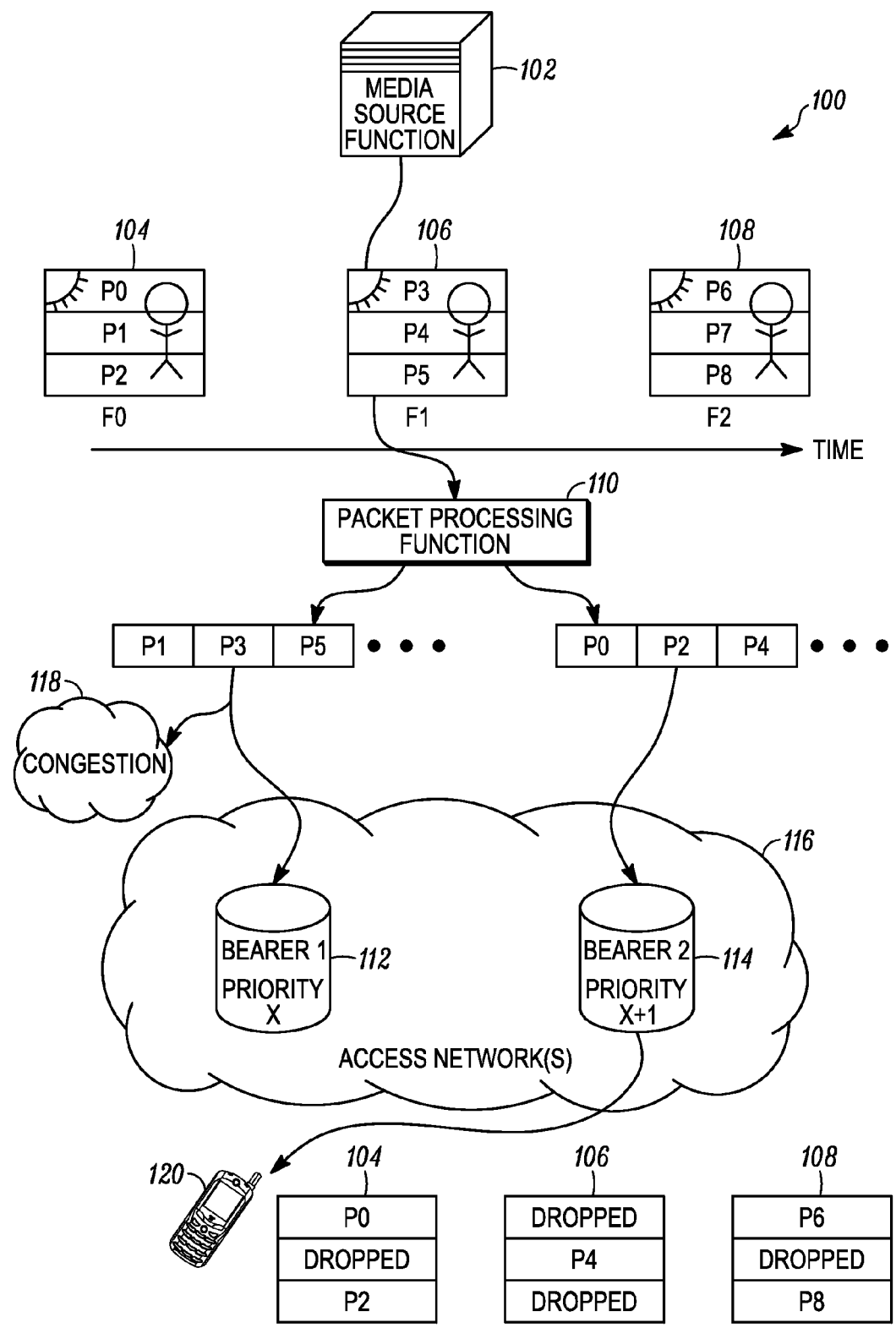
FIG. 1 is a diagram of a communication system that implements distribution of video packets over multiple bearers for providing unequal packet loss protection in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, a method and apparatus distributes video packets over multiple bearers for providing unequal packet loss protection. The method includes a packet processing function receiving a plurality of packets collectively comprising a flow of sequential data included in a sequence of media frames. For each packet, the packet processing function: applies a bearer selection process to select one of a plurality of bearers for transporting the packet over an access network, wherein each bearer has a different quality of service level which influences the probability of the transported packets being intentionally discarded by the access network, wherein the bearer selection process causes a distribution of the plurality of packets across the plurality of bearers such that each bearer carries non-consecutive packets both within any given media frame and across sequential media frames and provides unequal packet loss protection for the packets in the plurality; and provides, to an access network entity, an indication of the selected bearer.

The disclosed teachings cause a random-like dropping of media packets by a network during times of network bandwidth constraint, resulting in an overall better quality of media at a receiving function than when the network indiscriminately drops consecutive packets Those skilled in the art will realize that the above recognized advantages and other advantages described herein are merely illustrative and are not meant to be a complete rendering of all of the advantages of the various embodiments.

Referring now to the drawings, and in particular FIG. 1, a communication system that implements distribution of video packets over multiple bearers for providing unequal packet loss protection in accordance with some embodiments is shown and indicated generally at 100. In general, the system 100 includes a media sourcing function 102 having an application (not shown) that provides a sequence of media frames with each frame having one or more packets that are received into a packet processing function 110 that applies a bearer selection process or function in accordance with the present teachings in order to distribute the packets over multiple bearers (e.g., 112, 114) having unequal priority, for transport over one or more access networks 116 to a media receiving function 120.

The media sourcing function 102 may be included, for example, as an element of the infrastructure of a consumer, enterprise, or public safety network or as an element of a User Equipment (UE) device and includes one or more of: an application (e.g., Push-to-Video), stored media files or a media encoding function, etc.

In this illustrative implementation, the media sequence comprises a succession of multiple media frames. For example, FIG. 1 shows the media sourcing function 102 sourcing video frames F0 (104), F1 (106), and F2 (108), in a sequence over time (however, the present teachings are equally applicable to a media sequence comprising one or more audio frames sourced in a sequence). For efficient transport, each media frame is further divided into smaller blocks of data termed herein, in general, as "packets" (but also referred to in the art as datagrams, and the like, depending on the particular protocols used).

It follows then that video frames, for example, are typically split into multiple packets, with each packet containing a portion of the spatial data for the video frame. That spatial data is typically organized in a linear raster-scan fashion (i.e. top-to-bottom, left-to-right), as can be seen by packets P0 through P8, contained within frames F0, F1, and F2 of FIG. 1. As such, the data contained in neighboring video packets is typically collocated in a spatial and temporal fashion in the corresponding video frames. Notably, the amount of spatial data encoded into each packet is also typically fixed and constant across packets. Thus, the spatial area described by packet P1 is the same spatial area subsequently described by Packets P4 and P7.

Moreover, the media sourcing function 102 uses various protocols such as Internet Protocol (e.g., IP v 4 or IP v 6, described in Internet Engineering Task Force (IETF) Requests for Comments (RFC) 791 and 2460, respectively), User Datagram Protocol (UDP) (e.g., as described in IETF RFC 768), Real-Time Protocol (RTP) (e.g., as described in IETF RFC 3550) to format the frames and packets in such a way as to enable routing of the packets to the intended destination and to enable reassembly and decoding of the frames at the destination device.

The packet processing function 110 is a logical entity that receives the media packets and applies a bearer selection process or algorithm (for example, as part of a method as described below by reference to FIG. 2 and FIG. 3) to determine the bearer on which to send each packet. In accordance with the teachings herein, the bearer selection process causes a distribution of the plurality of packets across the plurality of bearers such that each bearer carries non-consecutive packets both within any given media frame and across sequential media frames. As the term is used herein, "consecutive" packets are packets which are consecutive within a given media frame or, in the case of video media, encode the same spatial area across consecutive media frames. By way of example, referring to FIG. 4, PACKET 0 and PACKET 1 of FRAME 0 are consecutive, as are PACKET 0 of FRAME 0 and PACKET 4 of FRAME 1. Conversely, PACKET 0 and PACKET 2 of FRAME 0 are non-consecutive, as are PACKET 3 of FRAME 0 and PACKET 4 of FRAME 1, as are PACKET 0 of FRAME 0 and PACKET 8 of FRAME 2. Returning to FIG. 1, the packet processing function 110 may reside on any number of devices within network 100, separately or distributed over multiple devices.

In one network configuration, the media sourcing function 102 is connected to the infrastructure of the access network. On the downlink from the media sourcing function 102 to the media receiving function 120 (as illustrated in FIG. 1), the packet processing function 110 could be included in the media sourcing function 102, within an access network 116 entity (i.e., an entity included in one of the access networks 116, such as within a Policy and Charging Rules Function (PCRF) within a Long Term Evolution (LTE) network), as a stand alone device (as illustrated) or be distributed across multiple of such devices. In another network configuration, the media sourcing function 102 is connected to the wireless interface of the access. On the uplink from the media sourcing function 102 to the media receiving function 120, the packet processing function could similarly be implemented in the media sourcing function 102 or as a stand alone device or be distributed across multiple of such devices.

Access networks 116 comprise infrastructure devices used for managing the allocation and maintenance of bearer resources for the transport of media traffic such as video and audio packets. Access networks 116 can include one or more access networks in any combination that provide the communication resources over which the media is transported. Examples of such access networks include, but are not limited to, one or more $3^{rd}$ Generation Partnership Project (3GPP) networks such as LTE, one or more Radio Access Networks (RANs) (e.g., an E-UTRAN (Evolved UMTS Terrestrial Radio Access Network), any 2G RAN, such as, Global System for Mobile Communication (GSM), any 3G RAN, such as CDMA EVDO, or any 4G RAN, such as WiMAX), or one or more Wireless LAN (WLANs), such as 802.11, or any other suitable wireless or wired access network with provisions for associating a quality of service with a bearer for transporting media traffic.

Within broadband networks, such as LTE, one or more bearers (e.g., 112, 114) may be allocated for transporting of the packets over the network. As the term is used herein, a "bearer" is a virtual concept that represents an allocation of physical resources over the access networks for transporting identified media traffic (also referred to in LTE as Service Data Flows (SDFs)), such as the video packets, and is associated with a quality of service (QoS) level (also, interchangeably, referred to herein as a priority level), which influences the probability of the transported packets being dropped.

In LTE, for example, a bearer can be a dedicated bearer or a default bearer. A default bearer is defined as a non-GBR (guaranteed bit rate) bearer that provides for "best effort" SDF transmission and is allocated to a UE for the duration of its attachment to the LTE network and need not be explicitly requested. A dedicated bearer is defined as any additional bearer that is established for the same UE and is specifically requested by (or on behalf of) a UE and can be either non-GBR or GBR, having a certain allocated or associated QoS or priority level as quantified by one or more QoS attributes, characteristics or parameters such as packet delay, packet loss rate, guaranteed or minimum bit rate, pre-emption capability, etc. Moreover, in LTE, QoS or priority level is specified in terms of such parameters as Allocation and Retention Priority (ARP), QoS Class Identifier (QCI), Maximum Bit Rate (MBR), Guaranteed Bit Rate (GBR), etc., which influences the probability of the transported packets being dropped, as follows.

For example, where an application wants to provide unequal or different levels of packet loss protection to certain packets when said packets are transported over the access networks 116, the application requests and is granted or allocated bearers having different priority (meaning quality of service) levels, e.g., bearers 112 and 114, respectively, having priority level X (which has the lower priority of the two bearers) and X+1, wherein X is the overall priority of the media flow with respect to other prioritized traffic. In theory, the application could request and reserve any number, N, of bearers, as allowed by the controlling protocol. In such a case, the N allocated bearers would have priority X+Y(N), where X is still the overall priority of the media flow with respect to other prioritized traffic, and where Y(N) (and the associated priority level of the bearer) is monotonically decreasing from [N−1] to 0, with X being the lowest priority level.

Accordingly, when the network is experiencing congestion 118, the network intentionally selects packets to drop based on the priority level assigned to the bearer over which the packets are transported. Thus, the higher the priority level of the bearer, the lower the probability of the network dropping or discarding packets being transported on the associated bearer, as compared to packets being transported on bearers having a lower priority level. Stated another way, the network will intentionally discard packets transported over bearers with lower priority levels before discarding packets being transported on bearers having higher priority levels, thereby, providing the unequal packet loss protection for the packets. This can be done on a packet by packet basis or the network may rescind a bearer altogether, such that the bearer is no longer available for transporting packets.

As mentioned above, priority level can be set by setting certain QoS parameters alone or in combination. For example, the unequal priority level of bearers 112, 114 could be enabled by assigning the bearers different ARP values, which influences the probability of the bearer being rescinded or pre-empted by the establishment of another bearer for traffic having a higher priority. The unequal priority level can also be enabled by assigning the bearers different QCI values, which control characteristics like packet delay, packet error loss rate, guaranteed or minimum bit rate, which in turn influence the probability of the transported packets being dropped. Also, the unequal priority level could be set by some combination of QCI value and ARP value. The exact means by which priority of a bearer, or the probability of the packets transported over said bearer being dropped, is expressed is dependent upon what quality of service parameters are supported by the network. By directing specific traffic to specific bearers, an application or intermediary function can control specifically which packets will be dropped when the network is no longer able to sustain a given bit rate.

The media receiving function 120 is a logical entity which receives media from the media sourcing function 102 by way of the access network 116. It may be included in any number of infrastructure and UE elements, the latter of which are also referred to in the art as subscribers or subscriber units, communication devices, access devices, access terminals, mobile stations, mobile subscriber units, mobile devices, user devices, and the like, and can be any type of communication device such as radios, mobile phones, mobile data terminals, Personal Digital Assistants (PDAs), laptops, two-way radios, cell phones, and any other device capable of operating in a wired or wireless environment and that can be used by public users (such as commercial users) or private users (such as public safety users).

Figure 2:
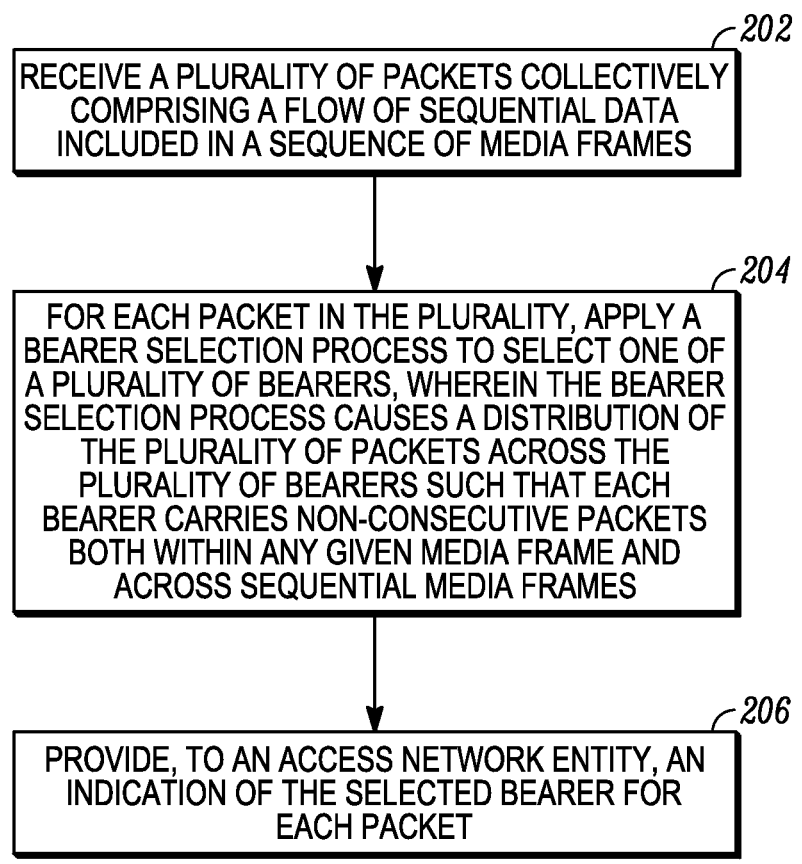
FIG. 2 is a flow diagram illustrating a method for distributing video packets over multiple bearers for providing unequal packet loss protection in accordance with some embodiments.
Figure 3:
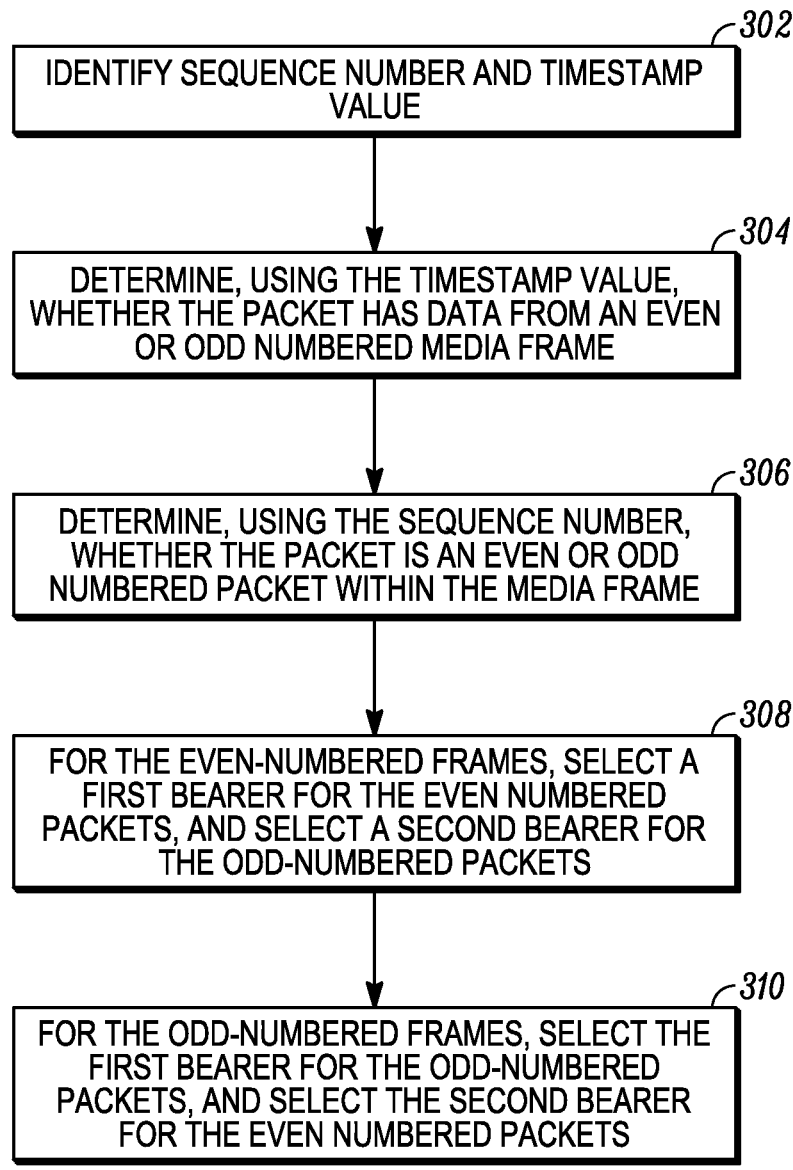
FIG. 3 is a flow diagram illustrating a method for bearer selection in accordance with some embodiments.

In general, the media sourcing function 102 (and its associated applications), packet processing function 110, access network 116 entities, and the media receiving function 120 (and its associated applications) are each implemented using (although not shown) a memory, one or more network interfaces, and a processing device that are operatively coupled, and which when programmed form the means for these system elements to implement their desired functionality, for example as illustrated by reference to the methods shown in FIG. 2 and FIG. 3. The network interfaces are used for passing signaling, (e.g., messages, packets, datagrams, frames, superframes, and the like) between the elements of the system 100. The implementation of the network interface in any particular element depends on the particular type of network, i.e., wired and/or wireless, to which the element is connected.

Where the network supports wireless communications, the interfaces comprise elements including processing, modulating, and transceiver elements that are operable in accordance with any one or more standard or proprietary wireless interfaces, such as EVDO, WCDMA, LTE, WiMax, WiFi, and the like, wherein some of the functionality of the processing, modulating, and transceiver elements may be performed by means of the processing device through programmed logic such as software applications or firmware stored on the memory device of the system element or through hardware.

The processing device utilized by these elements may be programmed with software or firmware logic or code for performing functionality described by reference to FIG. 2 and FIG. 3; and/or the processing device may be implemented in hardware, for example, as a state machine or ASIC (application specific integrated circuit). The memory implemented by these system elements can include short-term and/or long-term storage of various information needed for the functioning of the respective elements. The memory may further store software or firmware for programming the processing device with the logic or code needed to perform its functionality.

Turning now to FIG. 2, a flow diagram illustrating a method for distributing video packets over multiple bearers for providing unequal packet loss protection is shown and generally indicated at 200. Method 200 is performed in the packet processing function 110, and will be described in conjunction with the elements and packets shown in FIG. 1. Accordingly, at 202, the packet processing function 110 receives a plurality of packets from the media sourcing function 102, which collectively include a flow of sequential data included in a sequence of media frames. For instance, the packet processing function 110 receives a media stream from the media sourcing function 102, which comprises video frames F1 (having packets P0, P1, and P2), F2 (having packet P3, P4, and P5) and F3 (having packets P6, P7, and P8).

In one illustrative implementation, the media sourcing function implements Internet Protocol and RTP to format and send the video packets. Accordingly, an IP header is added to each packet to facilitate routing in the network. Included in the IP header is information such as but is not limited to, information identifying a source IP address or IPv6 network prefix for the sending application, a destination IP address or IPv6 network prefix for the receiving application, a source port number, a destination port number, and a protocol ID of the protocol above IP (collectively referred to in the art as the "IP 5 tuple" since there are five parameters).

Moreover, a RTP header is added to each packet. Included in the RTP header is information such as, but not limited to, a timestamp value, indicating the relationship between packets and media frames and a sequence number value, indicating the relative ordering of packets in the media stream. To determine the corresponding frame and information about the frame, the packet processing function 110, for instance, can determine from the timestamp value in the RTP header the numbered frame to which the packet belongs and the relative location of that frame in the media sequence.

Returning again to method 200, for each packet in the media stream, the packet processing function 110 applies (204) a bearer selection process to select one of a plurality of bearers for transporting the packet over an access network, wherein each bearer has a different quality of service level which influences the probability of the transported packets being intentionally discarded by the access network, wherein the bearer selection process causes a distribution of the plurality of packets across the plurality of bearers such that each bearer carries non-consecutive packets both within any given media frame and across sequential media frames, in accordance with various embodiments of the teachings herein. It should be noted that, in the present embodiment, it is immaterial which set of non-consecutive packets are assigned to a given bearer. The present teachings are designed to prevent consecutive packet loss, both within any given media frame and across sequential media frames, but not to identify certain media packets as being more or less significant to the quality of the media decoding.

One simple bearer selection methodology, when two bearers are allocated, comprises selecting a different one of the two bearers for every other packet processed. This methodology works well for audio packets, wherein there is one packet per audio frame, and for the packet sequence shown in packets 104, 106, and 108 of FIG. 1, wherein there are an odd number of packets (in this case three) comprising every video frame. In this example, packet loss will be intentionally well distributed across the frames, rather than being consecutive across some or all of the packets comprising frames 104, 106, and 108. Notably, lost spatial data occupying a specific region of a given video frame (e.g. packets P1 and P7) are bounded in time with received data for that same spatial region (e.g. Packets P4 and a packet in the same spatial area from the next frame in the sequence (not shown)). This will minimize additive errors and limit error propagation in this spatial region of the frame. Furthermore, by preventing consecutive packet loss within a frame, a robust decoder is able to further interpolate lost data (e.g. Packet P1) from neighboring received data for the same frame (e.g. Packets P0 and P2).

However, this simple algorithm does not always work and other algorithms are needed, for example, to process packets from media frames. In one illustrative bearer selection process, the packet processing function 110 selects a high priority level bearer for a first set of non-consecutive media packets and a low priority bearer level for a second set of non-consecutive media packets. Thus, packets present in the first set of non-consecutive media packets have the least relative probability of being dropped by the network when network bandwidth is constrained, while packets in the second set of non-consecutive media packets have the most relative probability of being dropped by the network when network bandwidth is constrained. Thus, when the network is bandwidth constrained, the media receiving devices will receive only the first set of non-consecutive packets, closely approximating random packet loss conditions under which error concealment algorithms perform optimally, and thus resulting in an overall better quality of media at a receiving function than when the network indiscriminately drops consecutive packets.

For instance, FIG. 3 illustrates a more particular example of a bearer selection process 300 performed by the packet processing function 110, in accordance with the present teachings. Method 300 includes: identifying (302) the sequence number and the timestamp value; determining (304), using the timestamp value, whether the packet has data from an even or odd numbered media frame; determining (306), using the sequence number, whether the packet is an even or odd numbered packet within the media frame; for the even-numbered frames, selecting (308) the first bearer for the even numbered packets, and selecting the second bearer for the odd-numbered packets; for the odd-numbered frames, selecting (310) the first bearer for the odd-numbered packets, and selecting the second bearer for the even-numbered packets.

Another illustrative algorithm for bearer selection is as follows:
1. For a new media flow:
   a. If required to enable prioritized packet handling in the underlying network which provides connectivity to the intended recipient, establish/reserve two bearers in the underlying network, one with priority X+Y, and one with priority X, where X is the overall priority of the media flow with respect to other prioritized traffic, and Y>=1.
2. Identify which packets of a given media flow comprise a given media frame (e.g. by examining the timestamp value).
3. Identify sequence numbers of packets within the given media flow.
4. For even-numbered media frames (as determined by the timestamp value),
   a. associate even-numbered packets (as determined by the sequence number value) of the even-numbered media frame with a first set of non-consecutive packets.
   b. associate odd-numbered packets of the even-numbered media with a second set of non-consecutive packets.
5. For odd-numbered media frames,
   a. associate odd-numbered packets of the odd-numbered media frame with a first set of non-consecutive packets.
   b. associate even-numbered packets of the odd-numbered media frame with a second set of non-consecutive packets.
6. Direct packets to network bearers (as determined by non-consecutive set association)
   a. Direct packets associated with a first set of non-consecutive packets to the bearer with priority X+Y, where X is the overall priority of the media flow with respect to other prioritized traffic, and Y>=1.
   b. Direct packets associated with a second set of non-consecutive packets to the bearer with priority X, where X is the overall priority of the media flow with respect to other prioritized traffic.

Employing this algorithm produces an illustrative assignment 400 of packets within media frames 402, 404, and 406 shown in FIG. 4. Notably, the specific algorithm iterated above is applicable for both audio and video streaming media, regardless of the number of packets comprising a media frame.

Looking back at the media stream transmitted by the media sourcing function 102, two bearers 112 and 114 were established for this media stream. Accordingly, bearer 114 (with the higher priority) is selected to transport packets from the first set of non-consecutive packets, wherein illustratively shown are packets P0 from frame F0 (104), P2 from frame F0, and P4 from frame F1 (106) are shown being transported using bearer 114. Moreover, bearer 112 (with the lower priority) is selected to transport packets from the second set of non-consecutive packets, wherein illustratively shown are packets P1 from frame F0 (104), P3 from frame F1 (106), and P5 from frame F1 are shown being transported using bearer 112. It should be noted that the above algorithm, which divides consecutive media packets equally across two available bearers, is merely illustrative, and instead could be embodied in such a way as to divide the packets across more than two bearers so long as the algorithm ensures that consecutive media packets are always placed onto bearers with differing levels of priority.

To facilitate the packets being transported over the correct bearer, the packet processing function 110 provides (206) to an access network entity an indication of the selected bearer for each packet. This can be done in a number of ways. For example, in one illustrative implementation, the packet processing function 110 places some type of value or bits into one or more of the headers on the packet for the network entity to use in identifying the appropriate bearer. For example, the value is inserted into a Type of Service field of an IP version 4 header (e.g., a TOS value) or in a Flow Identifier field of an IP version 6 header, which allows a Packet Data Gateway in a LTE network to match the packet, via the inserted value, to a Service Data Flow Template or Traffic Flow Template (TFT) (corresponding to the selected bearer), which corresponds to the same value.

As stated earlier, various QoS parameters can be used to set the unequal or different priority levels for the allocated bearers. For instance, in a LTE environment, the same "latency" may be imposed on all allocated bearers to ensure that packets arrive on-time, and roughly in order. Moreover, not all bearer reservations need to be associated with a Guaranteed Bit Rate. One bearer may be GBR, while the other may be Non-GBR with a low-latency requirement. In addition, each bearer can be characterized by a different QCI value for providing the different priority levels.

Also, each bearer can be characterized by a different ARP value for providing the different priority levels. In a further implementation scenario, a highest priority bearer in the plurality of bearers is not preemptable (e.g., bearer 114), and at least one of the other lower priority bearers (e.g., bearer 112) is preemptable, based on the setting of the ARP values. This can be done by setting for the first (highest priority) bearer the "not pre-emptable" flag (to ensure that it remains reserved if possible), along with the "can pre-empt" flag (indicating it should preempt existence of other pre-emptable bearers, such as secondary, tertiary, and lower priority bearers of other streams). Other secondary, tertiary, and lower priority bearers have the "is pre-emptable" flag set (indicating that the first bearers of other streams may preempt this bearer if necessary).

Thus, when the network is forced to ultimately rescind a bearer reservation such as from congestion 118 in the network, it will drop bearer 112 (and its associated packets) and then bearer 114. When transporting video, it is generally better to altogether drop traffic intended for the rescinded bearer, rather than allowing it to flow onto the default bearer. This may be advantageous, as the best effort streaming media data will likely arrive too late for the media decoding process, needlessly consuming bandwidth which would be better occupied by other, non-time-sensitive, best effort applications.

As shown in FIG. 1, when the network 116 selects bearer 112 to rescind, the packets (e.g., P1, P3, P5) being transported using that bearer are discarded or dropped. However, the media receiving function 120 continues to receive the packets (e.g., P0, P2, P4) transported using bearer 114. According, using the disclosed teachings, packet loss is well distributed over the frames which has a less detrimental effect on decoded spatial quality than packets dropped in a sequential fashion.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. For example, the method steps described herein and illustrated within the drawings do not necessarily require the order shown unless explicated stated herein. As such, the steps described may be taken out of sequence and come steps may be performed simultaneously and still fall within the scope of the teachings and the claims herein. In addition, benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for distribution of video packets over multiple bearers to provide unequal packet loss protection for these packets while being transported over a wireless network described herein. The non-processor circuits may include, but are not limited to, a radio receiver, a radio transmitter, signal drivers, clock circuits, power source circuits, and user input devices. As such, these functions may be interpreted as steps of a method to perform the distribution of video packets over multiple bearers to provide unequal packet loss protection for these packets while being transported over a wireless network described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for providing unequal packet loss protection in a network, the method comprising:
   receiving a plurality of packets collectively comprising a flow of sequential data included in a sequence of media frames;
   for each packet in the plurality,
   applying a bearer selection process to select one of a plurality of bearers for transporting the packet over an access network, wherein each bearer has a different quality of service level which influences the probability of the transported packets being intentionally discarded by the access network, wherein the bearer selection process causes a distribution of the plurality of packets across the plurality of bearers such that each bearer carries non-consecutive packets, wherein packets are consecutive when the packets are consecutive within a given media frame or when the packets encode a same spatial area across consecutive media frames in case of video media; and
   providing, to an access network entity, an indication of the selected bearer.

2. The method of claim 1, wherein each packet includes a timestamp value and a sequence number, wherein the plurality of bearers comprises a first bearer having a first quality of service level and a second bearer having a second quality of service level, and applying the bearer selection process comprises:
   for each packet in the plurality,
      identifying the sequence number and the timestamp value;
      determining, using the timestamp value, whether the packet has data from an even or odd numbered media frame;
      determining, using the sequence number, whether the packet is an even or odd numbered packet within the media frame;
      for the even-numbered frames, selecting the first bearer for the even numbered packets, and selecting the second bearer for the odd-numbered packets;
      for the odd-numbered frames, selecting the first bearer for the odd-numbered packets, and selecting the second bearer for the even-numbered packets.

3. The method of claim 2, wherein the data comprises video data.

4. The method of claim 2, wherein each packet comprise a Real Time Protocol header that includes the timestamp value and the sequence number.

5. The method of claim 1, wherein providing the indication of the selected bearer comprises inserting a value within the packet, wherein the value is used by the access network entity to transport the packet using the selected bearer.

6. The method of claim 5, wherein the packet includes an Internet Protocol header, and the value is inserted into a Type of Service field of the Internet Protocol header.

7. The method of claim 5, wherein the packet includes an Internet Protocol header, and the value is inserted into a Flow Identifier field of the Internet Protocol header.

8. The method of claim 1, wherein each bearer in the plurality is characterized by a different Allocation and Retention Priority (ARP) value for providing the different quality of service levels.

9. The method of claim 8, wherein a highest quality of service bearer in the plurality of bearers is not preemptable, and at least one of the other lower quality of service bearers is preemptable.

10. The method of claim 1, wherein each bearer in the plurality is characterized by a different QoS Class Identifier (QCI) value for providing the different quality of service levels.

11. The method of claim 1, wherein the plurality of bearers comprises two bearers, and wherein applying the bearer selection process comprises selecting a different one of the two bearers for every other packet processed within a media frame.

12. The method of claim 11, wherein the data comprise audio data.

13. A packet processing apparatus for distributing video packets over multiple bearers for providing unequal packet loss protection, the packet processing apparatus comprising:
   an interface that receives a plurality of packets collectively comprising a flow of sequential data included in a sequence of media frames; and a processing device that:
for each packet in the plurality, applies a bearer selection process to select one of a plurality of bearers for transporting the packet over an access network, wherein each bearer has a different quality of service level which influences the probability of the transported packets being intentionally discarded by the access network, wherein the bearer selection process causes a distribution of the plurality of packets across the plurality of bearers such that each bearer carries non-consecutive packets wherein packets are consecutive when the packets are consecutive within a given media frame or when the packets encode a same spatial area across consecutive media frames in case of video media; and
provides, to an access network entity, an indication of the selected bearer.

14. The packet processing function of claim 13, where the packet processing function resides in a User Equipment (UE) device.

15. The packet processing function of claim 13, where the packet processing function resides in an infrastructure device.

16. A non-transitory computer-readable storage element having computer readable code stored thereon for programming a computer to perform a method for distributing video packets over multiple bearers for providing unequal packet loss protection, the method comprising:
receiving a plurality of packets collectively comprising a flow of sequential data included in a sequence of media flames;
for each packet in the plurality,
applying a bearer selection process to select one of a plurality of bearers for transporting the packet over an access network, wherein each bearer has a different quality of service level which influences the probability of the transported packets being intentionally discarded by the access network, wherein the bearer selection process causes a distribution of the plurality of packets across the plurality of bearers such that each bearer carries non-consecutive packets, wherein packets are consecutive when the packets are consecutive within a given media flame or when the packets encode a same spatial area across consecutive media flames in case of video media; and
providing, to an access network entity, an indication of the selected bearer.

\* \* \* \* \*

UNITED STATES PATENT AND TRADEMARK OFFICE
CERTIFICATE OF CORRECTION

PATENT NO.        : 8,649,339 B2
APPLICATION NO.   : 12/910742
DATED             : February 11, 2014
INVENTOR(S)       : Bekiares et al.

Page 1 of 1

It is certified that error appears in the above-identified patent and that said Letters Patent is hereby corrected as shown below:

In the claims

In Column 13, Line 11, in Claim 13, delete "packets wherein" and insert -- packets, wherein --, therefor.

Signed and Sealed this
Third Day of May, 2016

Michelle K. Lee
*Director of the United States Patent and Trademark Office*